(12) United States Patent
Colling et al.

(10) Patent No.: US 6,945,349 B2
(45) Date of Patent: Sep. 20, 2005

(54) CONTROL ARRANGEMENT FOR A VEHICLE

(75) Inventors: Morgan Colling, Holo (SE); David Algesten, Stockholm (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/169,049

(22) PCT Filed: Dec. 21, 2000

(86) PCT No.: PCT/SE00/02623

§ 371 (c)(1),
(2), (4) Date: Jun. 24, 2002

(87) PCT Pub. No.: WO01/47738

PCT Pub. Date: Jul. 5, 2001

(65) Prior Publication Data

US 2003/0000763 A1 Jan. 2, 2003

(30) Foreign Application Priority Data

Dec. 23, 1999 (SE) ................................. 9904751

(51) Int. Cl.[7] .................................... B60K 26/02
(52) U.S. Cl. ....................................... 180/333
(58) Field of Search ................ 180/333, 336; 74/473.18, 413.19, 484 R

(56) References Cited

U.S. PATENT DOCUMENTS

| | | | | |
|---|---|---|---|---|
| 3,727,730 A | * | 4/1973 | Bianchetta et al. | 477/203 |
| 4,293,743 A | * | 10/1981 | Iwata et al. | 200/4 |
| 4,309,918 A | * | 1/1982 | Miller et al. | 477/92 |
| 4,503,300 A | * | 3/1985 | Lane, Jr. | 200/61.54 |
| 4,742,806 A | * | 5/1988 | Tart et al. | 123/322 |
| 4,884,057 A | * | 11/1989 | Leorat | 340/456 |
| 4,924,960 A | | 5/1990 | Crill | 180/333 |
| 4,966,044 A | * | 10/1990 | Bowman et al. | 74/335 |
| 5,099,720 A | * | 3/1992 | Raue | 477/144 |
| 5,335,743 A | * | 8/1994 | Gillbrand et al. | 180/178 |
| 5,496,098 A | * | 3/1996 | Brearley | 303/22.2 |
| 5,830,105 A | * | 11/1998 | Iizuka | 477/92 |
| 5,865,705 A | * | 2/1999 | Shamoto et al. | 477/79 |
| 6,151,977 A | * | 11/2000 | Menig et al. | 74/336 R |
| 6,172,312 B1 | * | 1/2001 | Maranzano | 200/61.28 |
| 6,223,112 B1 | * | 4/2001 | Nishino | 701/55 |
| 6,234,269 B1 | * | 5/2001 | Salzer et al. | 180/333 |
| 6,253,887 B1 | * | 7/2001 | Frank et al. | 188/197 |
| 6,260,431 B1 | * | 7/2001 | Yokoyama | 74/469 |
| 6,299,263 B1 | * | 10/2001 | Uematsu et al. | 303/192 |
| 6,318,493 B1 | * | 11/2001 | Mowatt | 180/336 |
| 6,347,273 B1 | * | 2/2002 | Adelsson et al. | 701/96 |
| 6,360,624 B1 | * | 3/2002 | Sedlmaier et al. | 74/335 |
| 6,532,841 B2 | * | 3/2003 | Medico et al. | 74/335 |
| 2001/0029799 A1 | * | 10/2001 | Ohashi et al. | 74/335 |

FOREIGN PATENT DOCUMENTS

| | | |
|---|---|---|
| DE | 19721166 | 2/1998 |
| EP | 0507745 | 10/1992 |
| WO | 9713651 | 4/1997 |

* cited by examiner

Primary Examiner—Teri Pham Luu
Assistant Examiner—Bret Hayes
(74) Attorney, Agent, or Firm—Ostrolenk, Faber, Gerb & Soffen, LLP

(57) ABSTRACT

A control device in a vehicle, which control device is connected to, and is for operating, a semi-automatic gearbox, can be set in various gearchange function positions and can, in at least one gearchange function position for traveling forwards, be operated for gear changing. The control device is also connected to, and is for operating, a supplementary brake. This control device replaces both the gear lever and the supplementary brake lever, resulting in increased driving safety and better ergonomics for the driver.

28 Claims, 5 Drawing Sheets

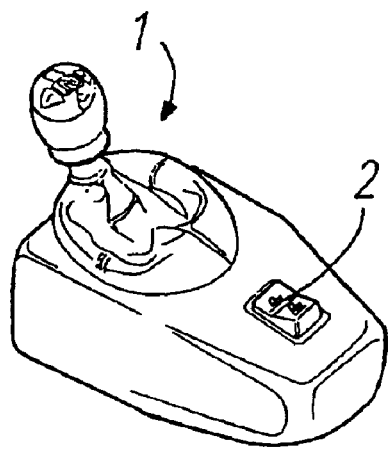
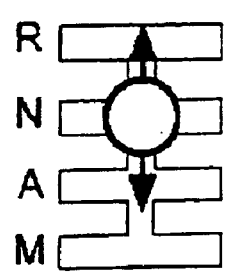
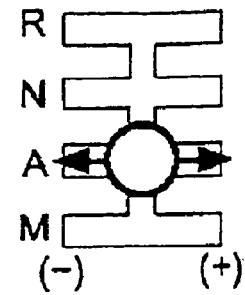
Fig. 1a Prior Art
Fig. 1b Prior Art
Fig. 1c Prior Art
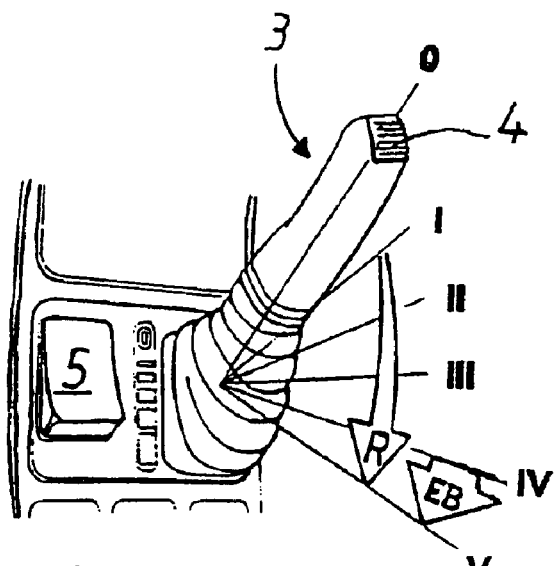
Fig 2 Prior Art

CONTROL ARRANGEMENT FOR A VEHICLE

BACKGROUND OF THE INVENTION

The present invention relates to a control device in a vehicle.

STATE OF THE ART

Developing the driver's environment in a vehicle involves endeavouring to render all controls and levers as readily accessible to the driver as possible. The more the driver can concentrate on the road, the safer the performance of the vehicle will be. A natural step is therefore to try to situate as many controls and functions as possible at or near the steering wheel.

One of the controls which the driver frequently uses is the gear lever. A gear lever for a semi-automatic gearbox is known from SE 462 246. The lever can be moved in the longitudinal direction of the vehicle for setting various functional positions. The positions are for manual gear selection (M), automatic gear selection (A), neutral (N) and reverse (R). In positions M and A the lever can be moved perpendicular to the longitudinal direction of the vehicle in order to change gear. The lever is conventionally situated beside the driver's seat, on top of the engine tunnel. This means that the driver has to take a hand off the steering wheel when operating the gear lever.

Many heavy vehicles are equipped with a hydraulic supplementary brake connected to the gearbox, a so-called retarder. A retarder consists of two vanes in a housing, one of which is fixed and the other rotates at a speed proportional to the vehicle's speed. Pumping hydraulic oil into the narrow space between the vanes creates a resistance which imparts a braking torque to the drive shafts. The retarder's braking effect is controlled by the driver by means of a lever which in certain applications can be drawn gradually towards the driver whereby the braking effect increases as the lever comes nearer to the driver. A usual location of this lever is on the instrument panel. This compels the driver to raise his/her arm and reach for the lever when he/she wishes to use it. This movement may be perceived as inconvenient and difficult, thereby contributing to the retarder not being used to the desirable extent.

There are also retarder levers situated at the steering wheel (see for example EP507745). It would be desirable for the gear lever for the aforesaid semi-automatic gearbox to be also situated at the steering wheel. A problem in shifting a number of controls and levers to the steering wheel, where for example flasher and windscreen wiper levers are already situated, is that the area becomes crowded and hence not readily accessible.

SUMMARY OF THE INVENTION

The object of the invention is to eliminate the above noted disadvantages and provide a new multi-functional control device which replaces both the gear lever and the retarder lever, resulting in greater driving safety and better ergonomics for the driver. This is achieved with an arrangement which is operable via one lever at the steering wheel.

The problem is solved by combining the gear lever and retarder lever in the form of a single lever mounted on the steering column. This enables the driver to both change gear and brake without taking his/her hands off the steering wheel. Combining the two functions in a single lever means that the space around the steering wheel is not so limited as it would be if each of them had its own control lever.

Having the combined gear and retarder lever located at the steering wheel improves the driver's driving situation in terms of safer gearchange procedure. The lever is substantially closer to the steering wheel than the conventional gear lever location on the engine tunnel, thereby making it easier for the driver to maintain concentration on the road during gearchange operations. Gear changing can be carried out without the driver having to take a hand off the steering wheel.

Valuable space in the vehicle's cab is also gained by removing the gear lever from the engine tunnel. This makes it easier for the driver to move from the driving seat to other spaces in the cab, e.g. the bunk.

The combined gear and retarder lever improves the ergonomics for the driver. As previously mentioned, the retarder lever on today's vehicles is often situated such that the driver has to reach for it when he wishes to use it. Making the control more readily accessible makes the retarder easier to use and increased use of this function is therefore to be expected.

Having a lever for two functions causes no conflict as regards the location of the lever such as would be the case if separate gear and retarder levers were situated at the steering wheel. Hence the lever can be situated at the best possible location from the ergonomic and practical point of view. A further advantage is that only one lever housing for the two functions has to be mounted on the steering column.

Stringent requirements with regard to user-friendliness and simplicity apply to a multi-function lever. The lever has to be intuitive and natural to use. This is particularly important for a lever which is used frequently. A further object of the invention is therefore to provide a multi-function lever which is of user-friendly and logical construction.

BRIEF DESCRIPTION OF THE DRAWINGS

FIG. 1a depicts a known gear lever for a semi-automatic gearbox and FIGS. 1b and 1c its gear positions.

FIG. 2 depicts a known retarder lever.

DESCRIPTION OF PREFERRED EMBODIMENTS

Figure 3:
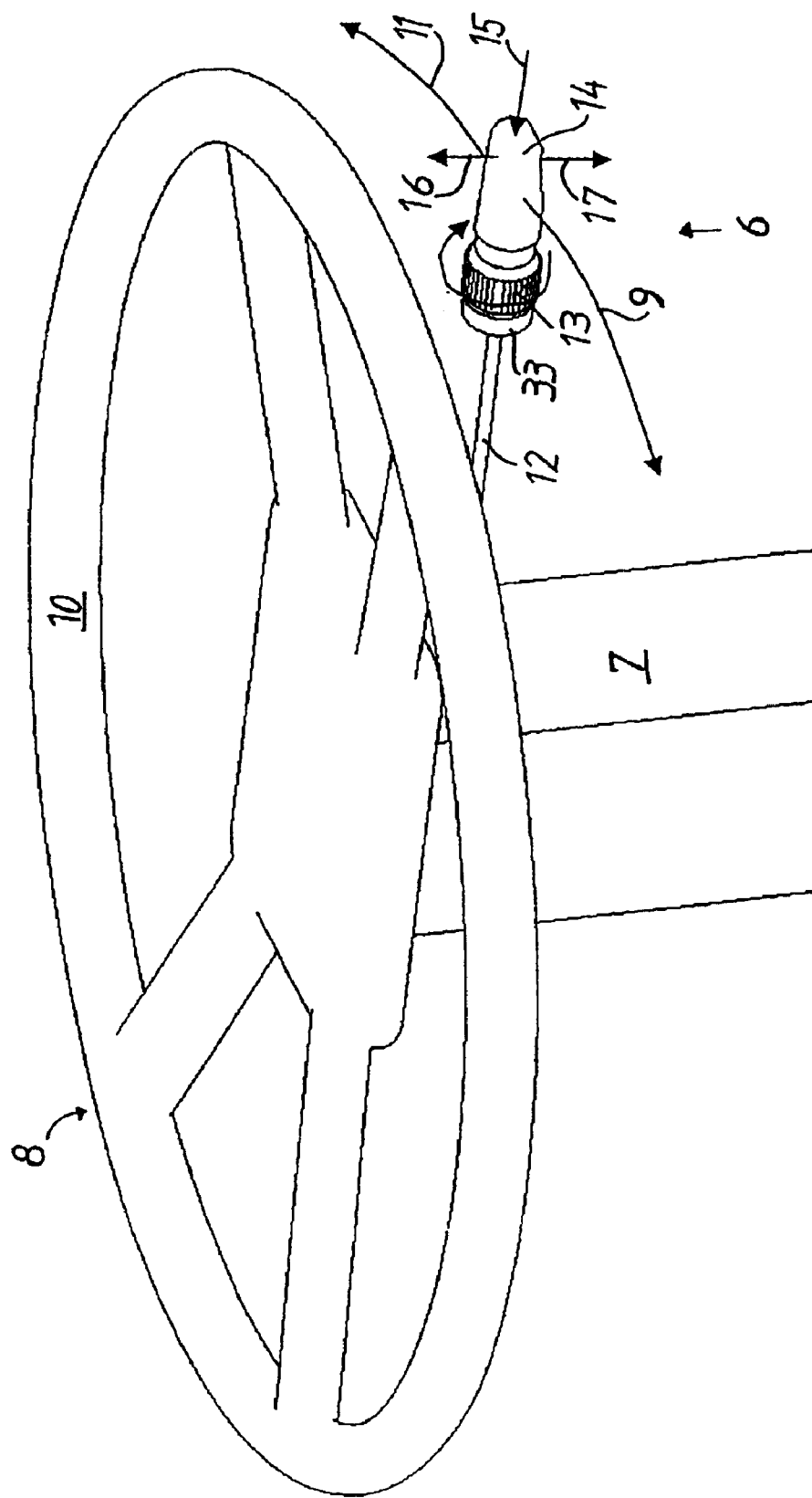
FIG. 3 depicts a control device according to the invention, mounted on a steering column.

The known gear lever (1) depicted in FIG. 1 is connected to a semi-automatic (so-called opticruise) gearbox whereby a computer-controlled system makes automatic gearchanging possible with a manual gearbox. Gear changes can be effected fully automatically by the computer or, if so desired, manually by the driver. The lever (1) is situated on the vehicle's engine tunnel beside the driving seat.

The driver selects for himself the driving program he wishes to use. The driving programs available are manual (M), automatic (A), neutral (N) and reverse (R). The desired driving program is set by the driver moving the lever (1) in the longitudinal direction of the vehicle (FIG. 1b) to the appropriate position (R, N, A or M). To change gear up or down, the lever is moved to the left or right respectively transversely to the longitudinal direction of the vehicle (FIG. 1c). Gear changing is possible irrespective of the driving program set (R, N, A or M).

A so-called bill button (2) is arranged adjacent to the gear lever (1). With this button the driver can activate the hill position, which is appropriate when running heavily laden on very hilly roads or steep gradients. When this position is activated and the automatic (A) driving program is selected with the lever (1), gear changes are quicker and take place at a higher engine speed than in the normal position.

The known lever (3) depicted in FIG. 2 is connected to a previously described so-called retarder. The retarder lever (3) is arranged on the instrument panel and can be placed in a number of positions (0–V), of which the initial position (0) means that the retarder is disconnected. The succession of other positions (I–V) provide a progressive increase in the retarder braking effect. The last position (V) also connects the exhaust brake (EB) to provide a further increase in the braking effect. Drawing the lever downwards towards the cab floor (in the direction of the arrow R) increases the braking effect.

The retarder function may also be made to act as a constant speed maintenance function by operating a button (4) on the lever (3). The retarder's braking effect is then adjusted automatically so that the vehicle endeavours to maintain the same speed, e.g. on downgrades. Pressing a button (5) enables this constant speed maintenance function to come in automatically as soon as the brake pedal is activated.

FIG. 3 depicts an embodiment of a combined gear and retarder control (6) according to the invention. The combined control (6) in this example is mounted in the steering column (7). This location at the steering wheel (8) has a number of advantages such as simplified operation, increased driving safety and better ergonomics. Other locations for the control are also conceivable, e.g. on the engine tunnel or the instrument panel. The control (6) in FIG. 3 takes the form of a lever. The lever's stem (12) is mounted in the steering column (7) in a manner conventional for control levers.

The retarder function is activated by moving the lever peripherally along the steering wheel rim. The braking effect increases gradually the further the lever is away from its initial position. If this movement for activating the retarder is executed clockwise (9) to increase the braking effect, the movement will resemble the well-established movement of previously known retarder levers, e.g. that depicted in FIG. 1. This movement is therefore perceived as natural for the brake function. In this case the braking effect will be reduced by moving the lever back anticlockwise (11) along the steering wheel rim (10). The zero position for the retarder is maximum anticlockwise.

The lever (6) has a rotatable portion (13) with which the driver can select the running position. This is done by turning the portion (13) step by step to the reverse, neutral or drive positions. The selectable running positions may be marked with letters on an unrotatable portion (33) of the lever. They may be marked, for example, R for reverse, N for neutral and D for drive in a manner known to most drivers. The rotatable portion (13) is advantageously provided with a mark (e.g. a dot) positioned centrally to the letter which denotes the running position selected. The letter which indicates the selected running position is preferably shown on a display on the instrument panel.

The lever's end portion (14) serves as a push-button and by pressing it substantially horizontally towards (15) the steering wheel the driver can switch between the manual and automatic positions. He/she thus chooses between manual or automatic gearchanging. This push-button function only works when the rotary portion (13) is in its Drive position. Upward or downward gear changes are effected respectively by the driver moving the lever substantially vertically upwards towards (16) and downwards away from (17) the steering wheel. The upward and downward gearchange function is non-locking so that the lever always reverts to its original position, a certain distance away from the steering wheel, after the gear change. Gear changing can be effected irrespective of the running position selected. The lever (6) might also be equipped with a button or the like for activating the constant speed maintenance function.

The embodiment according to FIG. 3 results in a very compact and flexible lever. The rotary portion (13) is used for selecting any of the running programs (Reverse, Neutral and Drive). When the Drive program is selected, switching between manual and automatic is effected by pressing the end (14) of the lever. As switching between manual and automatic is the most frequent running program change, the rotary portion (13) will be used relatively infrequently.

FIGS. 4–9 depict further embodiments of the invention. These diagrams depict the levers (6) as free-standing, but their stem (12) is intended to be fastened to a steering column in a conventional manner.

In all these embodiments (FIGS. 4–9) the retarder function is activated by moving the lever (6) peripherally along the steering wheel rim (10), preferably clockwise (9) (not shown in these drawings) in the same manner as in the embodiment depicted in FIG. 3. The braking effect increases gradually the further clockwise (9) the lever is moved. To reduce the braking effect the lever is moved anticlockwise (11) along the undepicted steering wheel rim (10). The zero position for the retarder is maximum anticlockwise.

Figure 4:
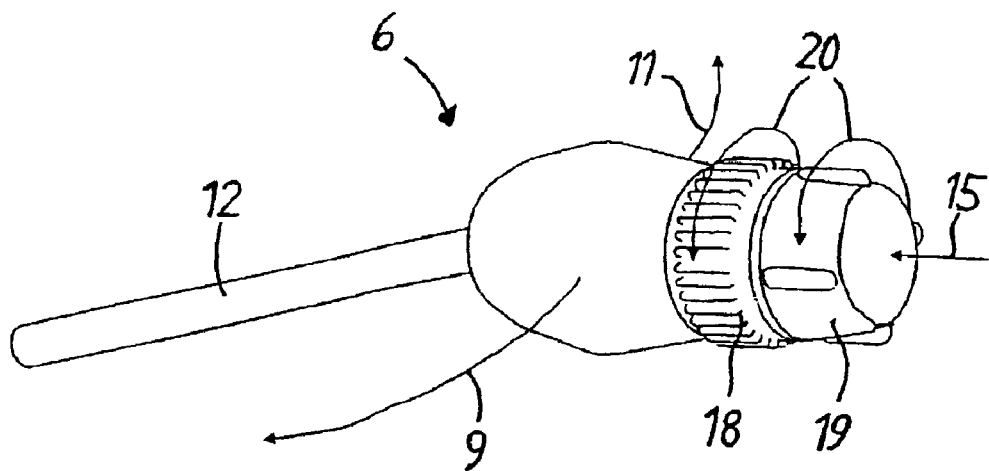
FIGS. 4–9 depict various embodiments of the control device according to the invention.

The lever (6) depicted in FIG. 4 incorporates two rotatable portions (18,19). The first (18) is for setting the selected running programme (Reverse, Neutral, Manual or Automatic) by turning the portion (18) step by step about the central axis of the lever. The second rotary portion (19), which is situated axially outside the first (18), effects upward and downward gearchanging. The rotary portion (19) may either be non-locking or have fixed positions. Changing up is effected by rotation in one direction, preferably towards the driver, and changing down by rotation in the opposite direction, preferably away from the driver. The retarder's constant speed maintenance function is activated by pressing the whole lever (6) axially inwards and preferably substantially horizontally (15) towards the steering column.

The advantage of this embodiment is that the respective functions of the retarder and the gearchange mechanism are distinguished purely in terms of movement. The rotation (20) is associated with operating the opticruise (the gearbox) and the clockwise/anticlockwise movement (9,11) peripherally along the steering wheel is associated with operating the retarder. This reduces the risk of retarder control being confused with opticruise control.

Figure 5:
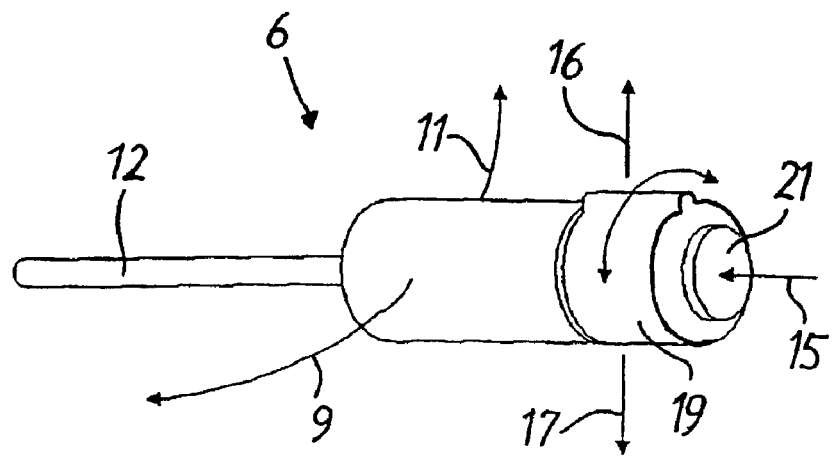

The embodiment depicted in FIG. 5 has great similarities with that in FIG. 4. One difference is that the running program is set by moving the lever (6) away from (17) and towards (16) the plane of the steering wheel in four positions (Reverse, Neutral, Manual and Automatic). The four running positions should be marked on the lever in some suitable manner, e.g. by letters situated logically on the lever. The running position selected is shown on a display on the instrument panel to make it easy for the driver to see which running position has been set at the time. The lever (6) incorporates a rotatable portion (19) for upward and downward gearchanging which functions in the same manner as depicted in FIG. 4. The end of the rotary portion (19), which in this case is arranged in the outer end of the lever (6), has on it a non-locking push-button (21) with which the button (21) axially inwards relative to the lever and advantageously in a direction substantially horizontal (15) to the vehicle's steering column.

Figure 6:
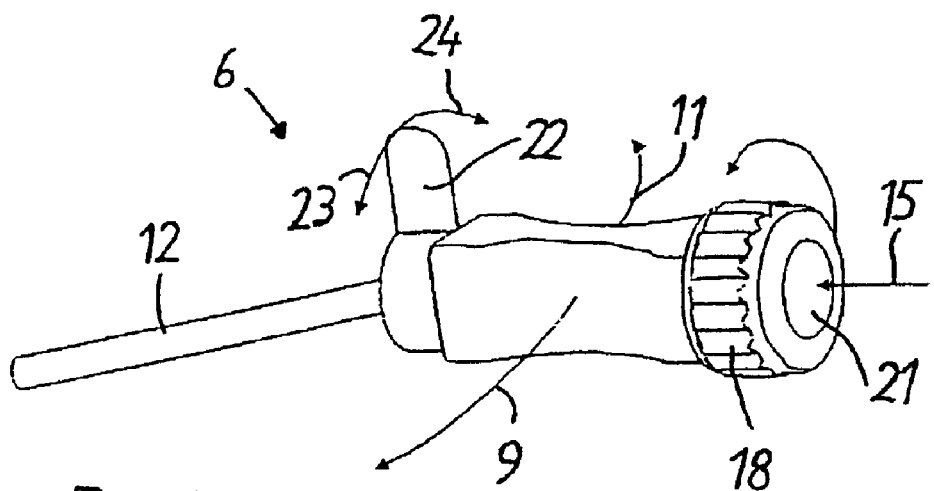

The lever (6) depicted in FIG. 6 likewise incorporates a rotary portion (18) for setting the running program. The portion (18) can be turned step by step about the central axis of the lever to set any of the running programs (Reverse, Neutral, Manual and Automatic). The end of the rotary portion (18), which here again is arranged in the outer end of the lever (6), has on it a non-locking push-button (23) with which the retarder's constant speed maintenance function can be activated in the same manner as described in FIG. 5.

Upward and downward gearchanging is effected with a non-locking toggle switch (22). Changing up is preferably by moving the toggle switch (22) towards (23) the driver and changing down by moving it away from (24) the driver, but the opposite is also conceivable. The fact that the toggle switch (22) is non-locking means that it can be operated with one or two fingers. The advantages of this embodiment are that all of the lever's functions are clearly distinguished in terms of movement and that the lever (6) is always the same distance away from the steering wheel.

Figure 7:
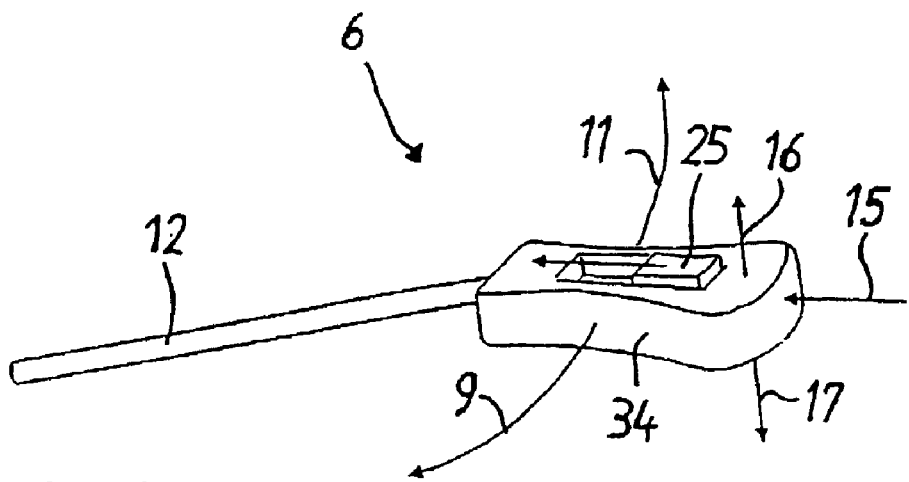

FIG. 7 depicts a lever (6) which incorporates a sliding knob (25) for setting the selected running program. The sliding knob (25) is moved step by step between the running positions. These are preferably marked on the fixed portion (34) of the lever, along the path of movement of the sliding knob. The selected running program is shown on a display on the instrument panel. Upward and downward gearchanging is effected in the same manner as in the embodiment according to FIG. 3. This is a movement which is usual for gear changing in racing contexts. The retarder's constant speed maintenance function is activated by the whole lever being pushed in substantially horizontally towards (15) the steering wheel.

Figure 8:
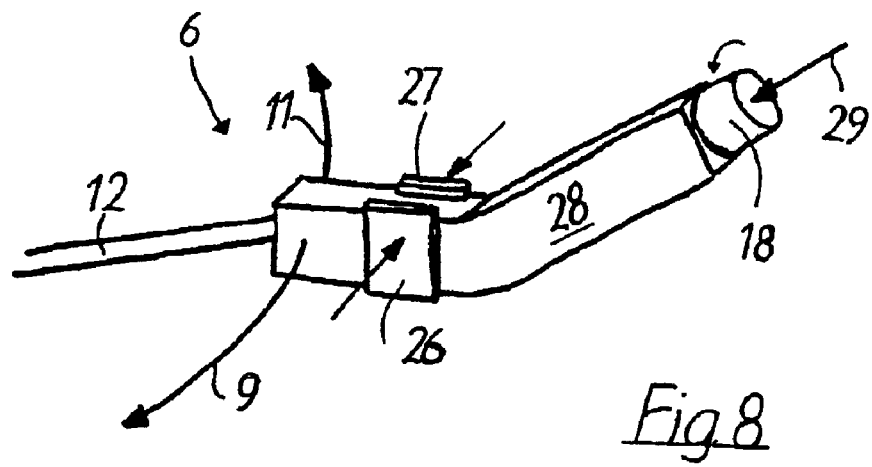

The lever (6) depicted in FIG. 8 incorporates a rotatable portion (18) for setting the running program in the same manner as in the embodiment depicted in FIG. 4. Upward and downward gearchanging is effected by two non-locking buttons (26,27), one for changing up and the other for changing down.

The lever (6) is somewhat angled. This makes it easy for the driver to take hold of the lever in order to use the retarder, since the lever protrudes besides the steering wheel. The buttons are in a relatively protected location beneath the steering wheel, so that there is relatively little risk of the driver inadvertently touching them. The retarder's constant speed maintenance function is activated by pressing the outer end of the lever in line (29) with the central axis of the angled portion (28) of the lever (6).

Figure 9:
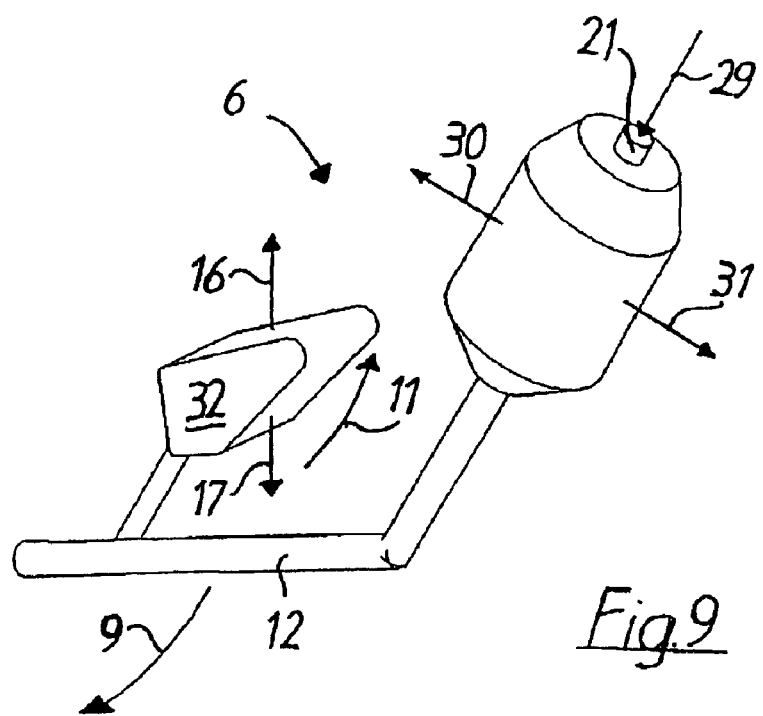

The lever (6) depicted in FIG. 9 is also angled. The running programme (Reverse, Neutral, Manual or Automatic) is selected by sliding the lever (6) away from (31) and towards (30) the steering wheel in four positions. This resembles the movement of today's opticruise lever (depicted in FIG. 1). The lever incorporates a permanently non-locking gearchange device (32) pivoting on the stem (12). In the embodiment depicted in FIG. 9, upward gearchanging is effected by moving the device (32) substantially vertically upwards (16) the steering wheel. If downward gearchanging is desired, the device (32) is moved in the same manner downwards (17) away from the steering wheel. Changing up and down might also be effected by moving the device (32) substantially horizontally forward and rearwards respectively instead. The device (32) may either follow the lever's retarder movement (9,11) or be independent of that movement and always stay in the same position. The retarder's constant speed maintenance function is activated by the driver pressing a button (21) at the outer end of the lever in line (29) with the central axis of the angled portion of the lever (6).

A multiplicity of further embodiments are possible by combining the patterns of movement described with the relevant functions (retarder braking, running program selection, gear changing and constant speed maintenance). The lever may also be equipped with a so-called hill button and/or an automatic retarder activation button. The lever's retarder movement is alike in all the embodiments described, but other movements, e.g. rotation, movement towards/away from the steering wheel etc, are also conceivable.

The lever and its movements may also be implemented with a satellite which protrudes from the vehicle's instrument panel and in which control devices corresponding to the lever can be incorporated. This solution also makes it easy for the driver to reach the control device for effecting gearchange and brake functions.

What is claimed is:

1. A control device for a vehicle for connection to and for operating a semi-automatic vehicle gearbox, wherein the gearbox is operable for being changed into various gear positions including at least one gear position for the vehicle traveling forward and wherein the vehicle has a steering wheel used for steering the vehicle, conventional brakes and a supplementary retarder brake in addition to the conventional brakes;

the control device being connected with the gearbox and the control device being settable in various gearchange function positions for setting the various gear positions of the gearbox; and the control device also being connected to the supplementary retarder brake for operating the supplementary retarder brake, whereby the control device operates both the semi-automatic gearbox and the supplementary retarder brake, the control device having a lever positioned in an area close to the vehicle steering wheel such that a vehicle operator may operate the lever;

the lever has a plurality of different respective patterns of movement with respect to the steering wheel, the lever is so connected to the gearbox as to set the various gear positions of the gearbox upon movement of the lever through a first pattern of the movements and the lever is connected to operate the supplementary brake upon the lever being moveable through a second pattern of the movements.

2. The control device of claim 1, wherein the steering wheel is in a plane and has a rim; the supplementary brake is operable to a varying extent and acts as a retarder;

the second pattern of the movements of the lever comprises moving a lever in a plane parallel with the plane of the steering wheel and along the rim of the steering wheel from a first lever position in which the retarder is inactive and in a direction which activates the retarder and increases the braking effect as the lever is moved in the direction.

3. The control device of claim 2, wherein the second pattern of the movements of the lever comprises the lever being moveable from a first position in which the supplementary brake is inactive and in a direction which activates the retarder and increases the braking effect as the lever is moved in the direction.

4. The control device of claim 3, wherein the lever includes a rotatable portion which is rotatable about a longitudinal axis of the lever in the first pattern of the movements to set selected gear change function positions.

5. The control device of claim 4, wherein the rotatable lever portion is rotatable step by step at least to set a reverse, a neutral and a drive gear position of the gearbox.

6. The control device of claim 3, wherein in the first pattern of the movements, the lever is moveable in relation to the steering wheel in a direction that is radially of and perpendicular to a longitudinal center line of the lever.

7. The control device of claim 6, wherein the lever is moveable in the first pattern of the movements in a series of steps, wherein each step corresponds to a respective gearchange function position.

8. The control device of claim 3, further comprising a sliding knob on the lever moveable in a longitudinal direction of the lever for performing the first pattern of the movements of the lever.

9. The control device of claim 8, wherein the lever is moveable in the first pattern of the movements in a series of steps, wherein each step corresponds to a respective gearchange function position.

10. The control device of claim 8, wherein the lever has a stem; at least a portion of the lever is non-lockingly moveable upward and downward from a plane substantially parallel to a longitudinal center line of the stem of the lever with such upward and downward movement establishing the gear change function positions.

11. The control device of claim 10, wherein the movement upward controls gearchange functions in one direction and the movement downward controls the gearchange functions in the other direction.

12. The control device of claim 6, wherein the lever has a stem; at least a portion of the lever is non-lockingly moveable upward and downward from a plane substantially parallel to a longitudinal center line of the stem of the lever with such upward and downward movement establishing the gear change function positions.

13. The control device of claim 12, wherein the movement upward controls gearchange functions in one direction and the movement downward controls the gearchange functions in the other direction.

14. The control device of claim 4, wherein the lever has a stem; at least a portion of the lever is non-lockingly moveable upward and downward from a plane substantially parallel to a longitudinal center line of the stem of the lever with such upward and downward movement establishing the gear change function positions.

15. The control device of claim 14, wherein the movement upward controls gearchange functions in one direction and the movement downward controls the gearchange functions in the other direction.

16. The control device of claim 6, wherein the lever includes a rotatable portion which can be rotated step by step about a central axis of the lever for selecting gears in gearchange function according to the first pattern of the movements.

17. The control device of claim 4, wherein the rotatable lever portion can be rotated step by step about a central axis of the lever for selecting gears in gearchange function according to the first pattern of the movements.

18. The control device of claim 6, wherein the lever includes a non-lockingly rotatable portion which is non-lockingly rotatable about a center line of the lever and the lever is moveable from a neutral position in the first pattern of the movements that comprises movement toward and away from a driver of the vehicle, with movement in one direction being for upward and movement in an opposite direction being for downward gearchanging.

19. The control device of claim 4, wherein the lever includes a non-lockingly rotatable portion which is non-lockingly rotatable about a center line of the lever and the lever is moveable from a neutral position in the first pattern of the movements that comprise movement toward and away from a driver of the vehicle, with movement in one direction being for upward and movement in an opposite direction being for downward gearchanging.

20. The control device of claim 8, wherein the lever includes and supports two non-locking buttons, and the first pattern of movements of the lever for gearchanging in an upward direction is obtainable by pressing one of the buttons and the first pattern of movements of the lever for downward gearchanging is obtainable by pressing the other of the buttons.

21. The control device of claim 6, wherein the lever includes and supports two non-locking buttons, and the first pattern of movements of the lever for gearchanging in an upward direction is obtainable by pressing one of the buttons and the first pattern of movements of the lever for downward gearchanging is obtainable by pressing the other of the buttons.

22. The control device of claim 4, wherein the lever includes and supports two non-locking buttons, and the first pattern of movements of the lever for gearchanging in an upward direction is obtainable by pressing one of the buttons and the first pattern of movements of the lever for downward gearchanging is obtainable by pressing the other of the buttons.

23. The control device of claim 4, wherein the lever includes an end portion, the lever being settable for a drive position of the gearbox, and in the drive position for the lever, the end portion of the lever is non-lockingly moveable in a longitudinal direction of the lever to be moveable radially inward toward the steering wheel establishing a third pattern of movement for effecting switching between functional positions either for manual gear shifting or automatic gear shifting of the gearbox dependent upon the longitudinal direction of movement of the end portion.

24. The control device of claim 1, further comprising an element for actuating constant speed maintenance function.

25. The control device according to claim 1, wherein the lever is operable in a third pattern of movements for setting a gear changing function for manual gear shifting or for automatic gear shifting.

26. The control device of claim 25, wherein the lever is operable in a fourth pattern of movements for activating a constant speed maintenance function.

27. The control device of claim 25, wherein the lever is operable generally toward and away from a driver for establishing the second pattern of the movements for operation of the supplementary brake; and the first and third patterns of movements are selected from among the group consisting of upward and downward movement of the lever with respect to the steering wheel, rotation of the lever with respect to the steering wheel, longitudinal movement of the lever inward and outward with respect to the steering wheel and buttons on the lever which are operable with respect to the lever, the selected ones of these movements for effecting at least one of the first and third patterns of movement of the lever.

28. The control device of claim 1, wherein the conventional brakes comprise front and rear brakes.

* * * * *